Patented Oct. 30, 1928.

1,690,021

UNITED STATES PATENT OFFICE.

GEORG KRÄNZLEIN AND FRITZ ROEMER, OF HOCHST-ON-THE-MAIN, GERMANY, ASSIGNORS TO GRASSELLI DYESTUFF CORPORATION, OF NEW YORK, N. Y., A CORPORATION OF DELAWARE.

MONODIAZO COMPOUNDS OF 1.4-DIAMINOANTHRAQUINONE-β-SULPHONIC ACIDS AND PROCESS OF PREPARING THE SAME.

No Drawing. Application filed January 18, 1927, Serial No. 161,954, and in Germany January 25, 1926.

Our present invention relates to monodiazo compounds of the 1.4-diaminoanthraquinone-beta-sulphonic acid compounds containing a sulphonic group in the 2-position.

We have found that 1.4-diaminoanthraquinone-2-sulphonic acid or derivatives thereof, for instance the compounds substituted in 6—or 7—position, yield by diazotization, even if there is a great excess of nitrate, either quinoneimide derivatives nor bisdiazo compounds, but solely the 1-amino-4-diazoanthraquinone-2-sulphonic acids.

The following examples serve to illustrate our invention, but they are not intended to limit it; the parts are by weight:

(1) 8 parts of sodium 1.4-diaminoanthraquinone-2-sulphonate, 100 parts of water and 3 parts of sulphuric acid of 66° Bé. are mixed and to this mixture are added, while stirring, 2 parts of sodium nitrite. Stirring is continued for some time. The reaction product is then filtered by suction and washed with a solution of common salt until neutral. It forms yellow crystals which are difficultly soluble in water and soluble in concentrated sulphuric acid to a brownish-yellow solution. It possesses the probable formula:

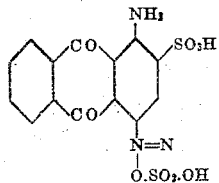

(2) 10 parts or sodium 1.4-diaminoanthraquinone-2.6-(or 2.7)-disulphonate are dissolved in 100 parts of water, and to this solution are added 3 parts of sulphuric acid of 66° Bé. and, while stirring, 2 parts of sodium nitrite. Stirring is continued for some time at room-temperature and the sodium 1-amino-4-diazoniumanthraquinone-2.6-(2.7)-disulphonate is separated by salting it out, whereupon it is filtered by suction and washed with a solution of common salt until neutral. It forms yellow crystals which are soluble in water and dissolve in concentrated sulphuric acid to a brownish-yellow solution. It possesses the probable formula:

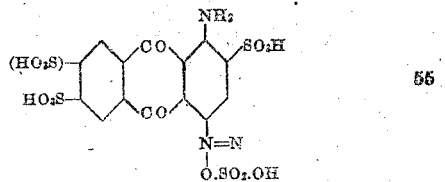

We claim:

1. A process of preparing monodiazo compounds of 1.4-diamino-anthraquinone-beta-sulphonic acid compounds containing a sulphonic group in the 2-position which consists in treating 1.4-diamino-anthraquinone-2-sulphonic acid compounds with sodium nitrite in the presence of mineral acids.

2. A process of preparing monodiazo compounds of 1.4-diamino-anthraquinone-2.6-disulphonic acid which consists in treating 1.4-diamino-anthraquinone-2.6-disulphonic acid with sodium nitrite in the presence of mineral acids.

3. As new products the monodiazo compounds of 1.4-diamino-anthraquinone-beta-sulphonic acid compounds containing a sulphonic group in the 2-position.

4. As new products 1-amino-2.6-disulphonic acid-anthraquinone-4-diazonium compounds.

5. As a new product 1-amino-2.6-disulphonic acid-anthraquinone-4-diazoniumsulphate which forms yellow crystals which are soluble in water and dissolve in concentrated sulphuric acid to a brownish yellow solution.

In testimony whereof we affix our signatures.

GEORG KRÄNZLEIN.
FRITZ ROEMER.

CERTIFICATE OF CORRECTION.

Patent No. 1,690,021.  Granted October 30, 1928, to

GEORG KRANZLEIN ET AL.

It is hereby certified that error appears in the printed specification of the above numbered patent requiring correction as follows: Page 1, line 10, for the word "either" read "neither"; and that the said Letters Patent should be read with this correction therein that the same may conform to the record of the case in the Patent Office.

Signed and sealed this 20th day of November, A. D. 1928.

(Seal)

M. J. Moore,
Acting Commissioner of Patents.